United States Patent
Li et al.

(10) Patent No.: US 12,144,075 B2
(45) Date of Patent: Nov. 12, 2024

(54) LIGHTING DEVICE WHICH RECEIVES POWER FROM AN EXTERNAL POWER SUPPLY

(71) Applicant: SIGNIFY HOLDING B.V., Eindhoven (NL)

(72) Inventors: Wei Li, Shanghai (CN); Yuanqiang Liu, Shanghai (CN); Meiping Mao, Shanghai (CN); Yuan Xin Chen, Shanghai (CN); Ru Yu Li, Shanghai (CN)

(73) Assignee: SIGNIFY HOLDING B.V., Eindhoven (NL)

( * ) Notice: Subject to any disclaimer, the term of this patent is extended or adjusted under 35 U.S.C. 154(b) by 81 days.

(21) Appl. No.: 17/915,250

(22) PCT Filed: Mar. 29, 2021

(86) PCT No.: PCT/EP2021/058144
§ 371 (c)(1),
(2) Date: Sep. 28, 2022

(87) PCT Pub. No.: WO2021/198173
PCT Pub. Date: Oct. 7, 2021

(65) Prior Publication Data
US 2023/0125816 A1    Apr. 27, 2023

(30) Foreign Application Priority Data

Apr. 2, 2020 (WO) ................. PCT/CN2020/083048
Jun. 11, 2020 (EP) ..................................... 20179437

(51) Int. Cl.
*H05B 45/18* (2020.01)
*H02M 1/32* (2007.01)
*H05B 45/37* (2020.01)

(52) U.S. Cl.
CPC ............ *H05B 45/18* (2020.01); *H02M 1/327* (2021.05); *H05B 45/37* (2020.01)

(58) Field of Classification Search
None
See application file for complete search history.

(56) References Cited

U.S. PATENT DOCUMENTS

| | | |
|---|---|---|
| 2010/0264737 A1 | 10/2010 | Chandler et al. |
| 2011/0068701 A1 | 3/2011 | Van de Ven et al. |
| 2012/0262074 A1* | 10/2012 | Wang ..................... H05B 45/18 315/193 |
| 2013/0293111 A1 | 11/2013 | Campbell |
| 2013/0328491 A1 | 12/2013 | Chou et al. |

(Continued)

FOREIGN PATENT DOCUMENTS

| | | | | |
|---|---|---|---|---|
| DE | 102018108412 A1 * | 10/2019 | ............. | H05B 45/48 |
| WO | 2014179379 A1 | 11/2014 | | |

*Primary Examiner* — Anh Q Tran

(57) ABSTRACT

A lighting device connects to an external power supply and includes a light emitting load and a secondary load. A temperature measurement is obtained related to a temperature of the external power supply. The secondary load is activated, thereby allowing the secondary load to be powered by the external power supply, when the temperature measurement is below a threshold. Thus, in cold conditions, an increased load is presented to the external power supply to assist start up of the external power supply in cold conditions.

15 Claims, 3 Drawing Sheets

(56) References Cited

U.S. PATENT DOCUMENTS

| | | | |
|---|---|---|---|
| 2014/0191659 A1* | 7/2014 | Wu | H05B 45/46 |
| | | | 315/53 |
| 2016/0014856 A1* | 1/2016 | Wacheux | H05B 45/3725 |
| | | | 315/122 |
| 2017/0047774 A1 | 2/2017 | Rezeanu et al. | |

* cited by examiner

LIGHTING DEVICE WHICH RECEIVES POWER FROM AN EXTERNAL POWER SUPPLY

CROSS-REFERENCE TO PRIOR APPLICATIONS

This application is the U.S. National Phase application under 35 U.S.C. § 371 of International Application No. PCT/EP2021/058144, filed on Mar. 29, 2021, which claims the benefits of European Patent Application No. 20179437.7, filed on Jun. 11, 2020 and Chinese Application No. PCT/CN2020/083048, filed on Apr. 2, 2020. These applications are hereby incorporated by reference herein.

FIELD OF THE INVENTION

The invention relates to lighting devices, in particular which receive power from an external power supply.

BACKGROUND OF THE INVENTION

There is a desire to reduce the power consumption of lighting devices, and many low power lighting devices are being developed. Most commonly, lighting devices in the form of LED lamps are used more and more widely. They provide many technical advantages, such as providing energy savings compared to previous lighting technologies, and hence giving reduced environmental impact.

Low voltage LED lamps, such as MR11, capsule G4, capsule G8, capsule G9, etc., are often used with electronic transformers. The circuit structure and parameters of mature electronic transformers on the market are mostly designed for incandescent lamps, halogen lamps and other high-power, high-energy consumption traditional lamps. The electronic transformer circuit structure, components and parameters require a high-power load so that the electronic transformer can work normally.

When the ambient temperature is low, the performance of the components inside the electronic transformer deteriorates, with the result that the electronic transformers need a higher power load to work normally at low ambient temperature. Otherwise, the output voltage of the electronic transformer may be too low or unstable due to the abnormal operation of its internal components and circuits. This problem widely exists. For example, both the electronic transformer and the lamp may be used in an outdoor environment or cold indoor environment. The outdoor application includes, for example, the outdoor corridor of some hotels, in winter mornings or nights, or in cold areas, etc. The cold indoor application includes, for example, fast food restaurant/beverage shop, aisles of stores and hotels, lift lobbies, or even living rooms, in winter mornings or nights, or in cold areas, etc.

The luminous efficiency of LEDs is continually increasing such that the trend for LED lamps is a reduction in power. This may lead to a compatibility issue between a LED lamp and a traditional electronic transformer, especially when the ambient temperature is low. For example, an electronic transformer may be difficult to start up or tend to flicker when the ambient temperature is low, particularly when used with low power LED lamps. The LED lamp itself typically has specific requirements for its output lumen and input power, and these requirements may also not be met.

There is a need to retain compatibility of a low power lighting device with existing power supplies, which are for example designed for higher power lighting solutions, and particularly at low temperatures when compatibility is a particular potential issue.

US20100264737A1 discloses a solution in which a battery to a LED load is used in an attenuated powering cycle when the battery is cold.

SUMMARY OF THE INVENTION

It is a concept of the invention to provide temperature monitoring in lighting device for indirectly monitoring a temperature of an external power supply, such as an electronic transformer. At low temperatures, a secondary load is activated (in addition to the lighting load) to help with start up (or indeed continuous operation) of the external power supply.

The invention is defined by the claims.

According to examples in accordance with an aspect of the invention, there is provided a lighting device comprising:
  an input adapted to connect to an external power supply;
  a light emitting load to be powered by the external power supply;
  a secondary load to be powered by the external power supply;
  a controller configured to:
    receive a temperature measurement, which temperature measurement is related to a temperature of the external power supply;
    activate the secondary load, thereby allowing the secondary load to be powered by the external power supply, when the temperature measurement is below a threshold.

When the measured temperature is low, the external power supply may need an increased load to operate correctly. This is in particular the case for a power supply in the form of an electronic transformer. This increased load may for example be used during a start up phase when there is a low temperature. This helps the external power supply to start and operate stably.

The measured temperature is related to the external power supply. By this is meant that an increase in temperature of the external power supply is picked up by the temperature measured. The temperature sensor used for the temperature measurement does not need to be in direct thermal contact with the external power supply. Indeed, it is for example part of the lighting device. Before operation of the lighting device and the external power supply, they are supposed to be both be at the same/similar, ambient, temperature. In most sites they are indeed installed like this, for example put in the same room and above the false ceiling, etc. During use, there is a positive correlation between the temperatures of the external power supply and of the lighting device, and their temperatures both will increase to a proper temperature of the external power supply, at same speed, proportional speed or correlated speed. The temperature measurement is thus preferably an indirect measurement of the temperature of the external power supply.

The secondary load is used to adjust the input power of the LED lamp (which forms the load of the external power supply) according to the working status of the external power supply. The external power supply can thereby start up and work normally in a low temperature environment, but the brightness of the lighting load can also remain unchanged. The input power of the lighting load can meet the requirements of the specification when it works stably at or above the ambient temperature of e.g. 25 degrees Celsius.

By deactivating the secondary load when not needed, power is saved when the secondary load is not needed. In gradual operation, the temperature of the external power supply will increase; alternatively, the ambient temperature is already warm in start up, and in both cases the secondary load may be able to be deactivated. Thus, the secondary load does not need to present a long term increase, if any, in power consumption (and hence reduction in efficiency) but only during a cold start up phase, if the compatibility issue only arises during start up.

The threshold applied to the temperature sensing corresponds to a temperature of the external power supply below which the external power supply does not work normally for a load comprising the light emitting load alone. If the temperature of the power supply is too low, it may not start or operate correctly when powering the light emitting load. The secondary load enables correct operation of the power supply.

The controller may be adapted to deactivate the secondary load thereby disallowing the external power supply to power the secondary load when the temperature measurement is above the threshold. Thus, the secondary load is only for (temporarily) controlling the load seen by the power supply.

The secondary load is non-light emitting, for example it is for example a load resistor. This is a simple load which can easily be incorporated into the circuitry of the lighting device.

In a hysteresis/latch control method, the controller is adapted to keep deactivating the secondary load after deactivating it, even if the temperature measurement provided by the temperature sensor drops again below the threshold. This is based on a situation wherein the temperature measurement provided by the temperature sensor in the lamp, namely the temperature of the lamp, drops again since the secondary load is decoupled and heat generation of the lamp is reduced. But since the electronic transformer has already been warmed up, there is no need to activate the secondary load again.

The secondary load is for example in series with the light emitting load. A LED driver is placed between the electronic transformer and the light emitting load, and it converts the electronic transformer's output voltage to drive current to the light emitting load and the secondary load. Thus, the presence or absence of the secondary load, in series, does not alter the light output (assuming drive voltage conditions are met), which is a function of the current. This is particularly simple and useful. Since the LED driver needs to power a higher load, its load as seen by the electronic transformer is also large thereby making the electronic transformer work stably at low temperatures.

The lighting device may comprise a temperature sensor for providing the temperature measurement to the controller, wherein the temperature sensor is placed in the lighting device and adapted to indirectly reflect the temperature of the external power supply. The temperature sensor is thus within the lighting device, for example part of a lamp. This implementation is also based on a fact that the lamp's temperature is positively correlated with the temperature of the electronic transformer. The idea of indirectly monitoring means that the monitoring is implemented inside the lamp, not in the external power supply. It does not require a temperature sensor at the external power supply and informing the lamp, so it does not require any change to the existing external power supply but only a change to the lamp circuit, thereby having low cost for the costumer. Alternatively, the controller could also receive the temperature measurement from an external entity, such as: a dedicated control signal from a dedicated temperature sensor attached to or in the external power supply; or a specific power waveform directly from the external power supply informing that the external power supply is already warms up.

The temperature sensor for example comprises a negative temperature coefficient resistor. This is a simple low cost way to provide a signal (e.g. the voltage across the resistor) which depends on temperature. It may for example be part of a resistor divider.

The controller may comprise a bypass switch in parallel with the secondary load for bypassing the secondary load, in response to the temperature measurement. Thus, the secondary load is either in the circuit or bypassed, providing a simple switch-controlled load variation.

The controller may comprise a further switch which is controlled based on the temperature measurement, wherein the switch state of the further switch determines the switch state of the bypass switch.

The lighting device may comprise an LED lamp, wherein the load comprises an LED arrangement, and the lighting device further comprises an LED driver circuit between the external power supply and the LED arrangement. The driver circuit for example delivers a regulated current. It may for example comprise a switch mode power converter. The electronic transformer for example delivers a regulated high frequency AC voltage, e.g. 12V rms value, and the LED driver circuit is for example a regulated current driver for providing a regulated current to the LEDs by rectifying and converting the AC voltage.

The LED driver for example comprises a single stage power converter. A PFC stage is not needed since the external power supply would already implement PFC function, so a single stage converter may be used, such as a buck converter, boost converter, or flyback converter, etc.

The external power supply is preferably an electronic transformer.

The invention also provides a lighting installation, comprising:
  a lighting device as defined above; and
  the electronic transformer adapted to power the lighting device.

The invention also provides a method of controlling a lighting device comprising a lighting load, comprising:
  obtaining a temperature measurement, which temperature measurement is related to a temperature at the external power supply; and
  if the temperature measurement is below a threshold, activating a secondary load, thereby using an external power supply to power the lighting load and the secondary load; and
  if the temperature measurement is above the threshold, deactivating the secondary load thereby using the external power supply to power the lighting load and not the secondary load.

The method may comprise using an electronic transformer, external to the lighting device, as the external power supply, and obtaining the temperature measurement internally of the lighting device which temperature measurement indirectly reflects the temperature of the electronic transformer.

These and other aspects of the invention will be apparent from and elucidated with reference to the embodiment(s) described hereinafter.

BRIEF DESCRIPTION OF THE DRAWINGS

For a better understanding of the invention, and to show more clearly how it may be carried into effect, reference will now be made, by way of example only, to the accompanying drawings, in which.

DETAILED DESCRIPTION OF THE EMBODIMENTS

Figure 1:
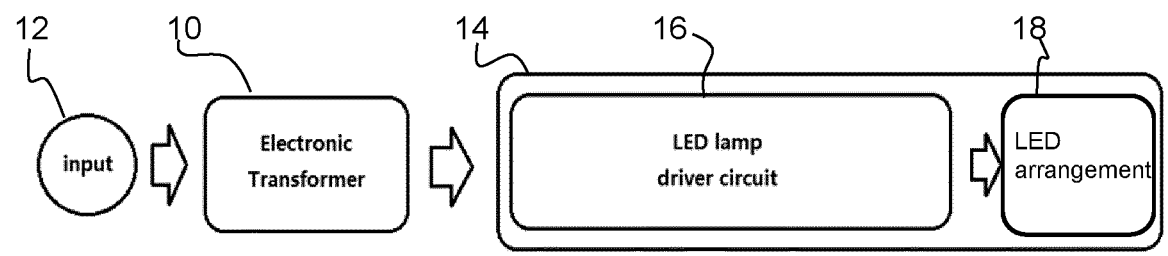
FIG. 1 shows a typical low power LED lighting device.

The invention will be described with reference to the Figures.

It should be understood that the detailed description and specific examples, while indicating exemplary embodiments of the apparatus, systems and methods, are intended for purposes of illustration only and are not intended to limit the scope of the invention. These and other features, aspects, and advantages of the apparatus, systems and methods of the present invention will become better understood from the following description, appended claims, and accompanying drawings. It should be understood that the Figures are merely schematic and are not drawn to scale. It should also be understood that the same reference numerals are used throughout the Figures to indicate the same or similar parts.

The invention provides a lighting device connects to an external power supply and includes a light emitting load and a secondary load. A temperature measurement is obtained related to a temperature of the external power supply. The secondary load is activated, thereby allowing the external power supply to power the secondary load, when the temperature measurement is below a threshold. Thus, in cold conditions, an increased load is presented to the external power supply to assist start up and stable operation of the external power supply in cold conditions.

FIG. 1 shows a typical low power LED lighting device, or called as a LED lamp, 14. The lighting device connects to an external power supply, in this example an electronic transformer 10, which for example receives an AC mains input 12. The electronic transformer 10 delivers a reduced voltage (e.g. AC 12V rms value) to the LED lamp 14. The LED lamp 14 comprises a LED driver 16 and an LED arrangement 18. The electronic transformer may deliver an AC voltage in which case the LED driver 16 provide AC/DC functionality to convert the AC voltage into a rated current of the LED arrangement 18. The LED driver 16 may be a switched mode power supply. The LED arrangement 18 may be a array of LEDs, such as a series, parallel or hybrid of series and parallel of LEDs.

Figure 2:
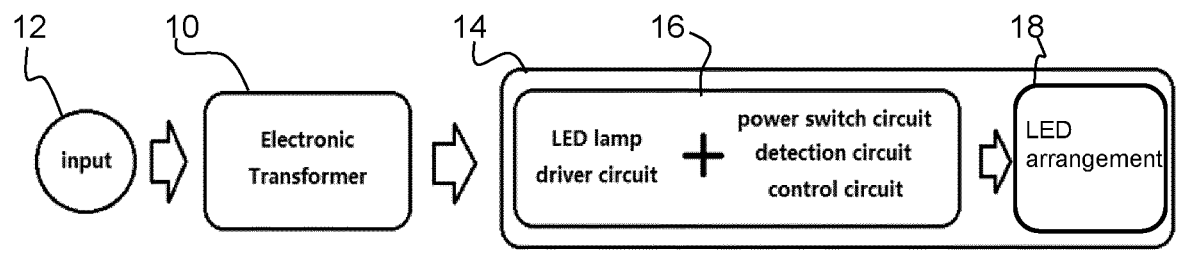
FIG. 2 shows in schematic from a lighting device in accordance with the invention.

FIG. 2 shows in schematic from a lighting device in accordance with the invention. The LED driver 16 of the LED lamp 14 includes additional circuitry for switching the power of the load presented to the electronic transformer. A temperature detection circuit is used to determine the appropriate load, and a control circuit implements the control of the power switching circuit. The additional circuitry addresses the compatibility problem at low temperatures, or with low power LED lamps. The aim is to shift the input power of the LED lamp (seen by the external power supply) according to the temperature of the external power supply without affecting the output lumen of the LED lamp.

Figure 3:
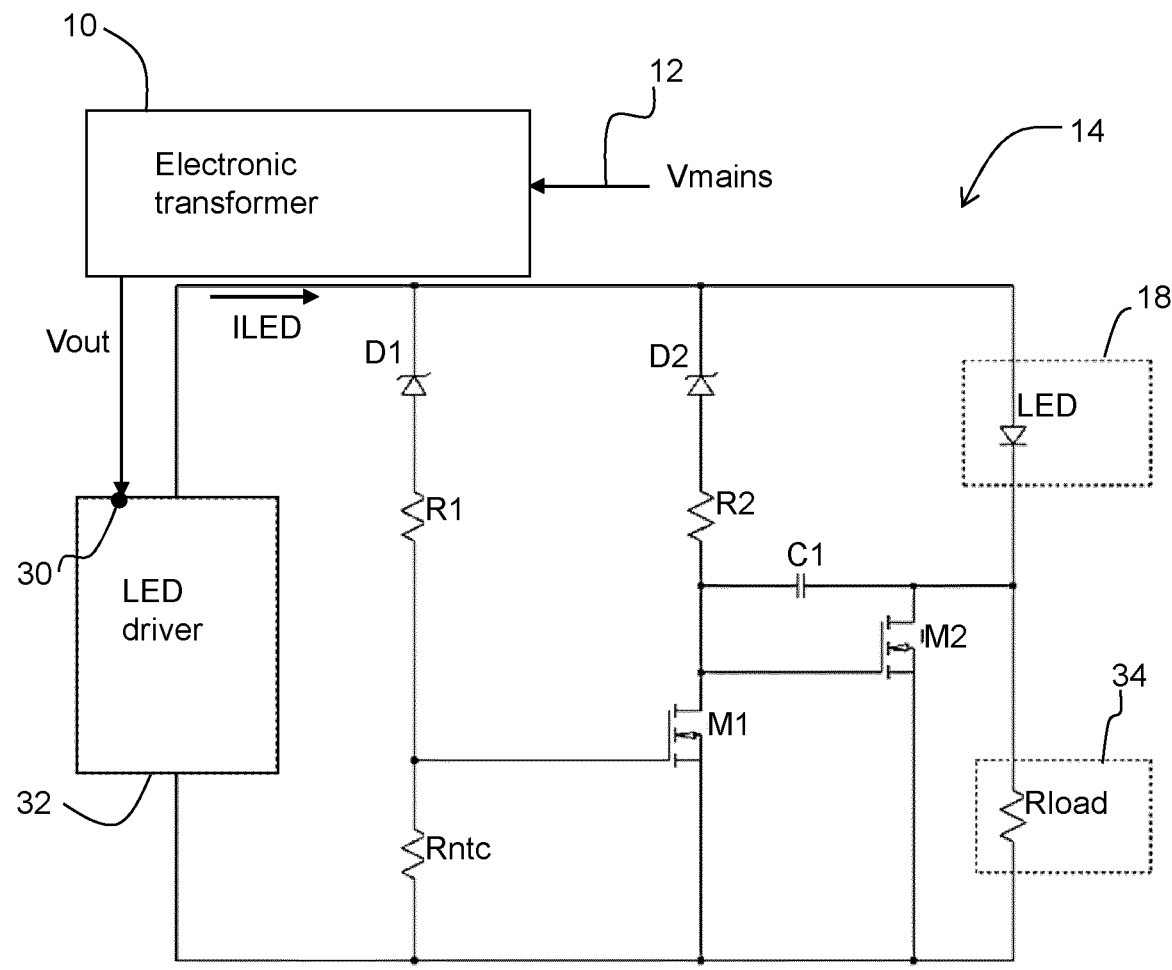
FIG. 3 shows one possible implementation of the lamp circuitry.

FIG. 3 shows one possible implementation of the lamp circuitry. There are however many possible circuits that can shift the input power of a LED lamp according to a sensed temperature, and FIG. 3 is just one example.

This circuit is based on the assumption that a temperature within the lamp 14 is correlated with the temperature of the electronic transformer 10. This assumption is reasonable since both of the lamp 14 and the electronic transformer 10 are placed in the same ambient environment, and have similar electrical power loss/efficiency to heat itself. Thus, the sensed temperature in the lamp relates to the temperature of the electronic transformer. For example, the initial temperature (e.g. the ambient temperature) of both will be the same at start up; and the temperature of both will increase similarly. It is noted that it is not required to have a hard thermal coupling between the electronic transformer and the LED lamp.

The circuit comprises a detection circuit, a control circuit, and a power shifting circuit.

The detection circuit comprises a negative temperature coefficient (NTC) resistor Rntc. This provides information about the temperature in the lamp and indirectly the temperature of the electronic transformer 10 based on the temperature of the resistor Rntc in the LED lamp 14. Experiments can be done to find a proper NTC coefficient, such that a temperature triggered by the notch would well reflect that the electronic transformer 10 has entered the proper temperature/working state.

The circuit of the lamp 14 has an input 30, which connects to an input of a LED driver unit 32 adapted to connect to the output Vout of the external power supply. This is for example a low voltage e.g. 12V AC or DC signal generated by an electronic transformer 10. The LED driver unit 32 for example comprises a single stage power converter. A PFC stage is not needed, so a single stage converter may be used, such as a buck converter, boost converter, or flyback converter, etc.

The LED arrangement 18 forms a light emitting load to be powered by the external power supply. However, there is also a secondary load 34 to be powered by the external power supply. The secondary load is in series with the LED arrangement 18. Thus, if a regulated current is delivered to the LED arrangement and the secondary load, the secondary load 34 will not influence the light output (as long as the operating voltage is sufficient to drive the LED arrangement). The secondary load is a non-light emitting load, such as a resistor Rload.

A controller receives a temperature measurement as a voltage across the resistor Rntc. The controller comprises the transistor circuit based on switches M1 and M2, shown as MOSFETs M1 and M2. The temperature measurement is related to a temperature of the external power supply i.e. the electronic transformer 10, i.e. there is some correlation between the temperatures at the electronic transformer and at the lamp; this is most evident when both are at the ambient temperature and temperature increasing speed are correlated. The power loss in the electronic transformer causes heat generation and thus a temperature rise in the electronic transformer. The power loss of the LED driver 32 and the heat generation of the LED 18 and the resistor 34 cause temperature rise of the LED lamp.

The secondary load 34 can be activated and deactivated by the controller, thereby allowing the external power supply to power the secondary load, when the temperature measurement is below a threshold.

The resistor Rntc forms a voltage dividing circuit with the further resistor R1 (and the level shifting Zener diode D1), and thus forms a detection circuit. This detection circuit is used to control whether the transistor M1 is on or off, and the status of the transistor M1 is used to control whether the transistor M2 is on or off.

The transistor M1 is powered through a level shifting Zener diode D2 and a supply resistor R2. The transistor M2 is turned on by the same supply circuit D2, R2 when transistor M1 is turned off.

The capacitor C1 forms a filter circuit with the resistor R2 to suppress current spikes during switching between the power regimes. This is discussed further below.

When the resistance of the NTC resistor Rntc is high, at a low temperature, the voltage on Rntc is high, which will turn on the transistor M1, and the transistor M2 will be turned off, so, the LED lamp will work in a high-power regime. The LED arrangement 18 and the secondary load 34 are in series, presenting a large load to LED driver 32 which then presents a large load to the external power supply. Thus, when the transistor M2 is off, the output current flows through the LED arrangement and the load resistance Rload, and there will be additional power loss on Rload, hence the LED lamp works in the high-power regime. However, the output lumen does not increase.

The resistance of the NTC resistor Rntc decreases when its temperature increases, so the voltage on Rntc becomes lower. This will, at a certain point, turn off the transistor M1, and the transistor M2 will be turned on, so, the LED lamp will work in a low-power regime. The transistor M2 is used to bypass the secondary load 34. The output current flows through the LED arrangement 18, and most of the current flows through the transistor M2 with hardly any flowing through the secondary load Rload. Thus, there will be almost no additional power loss on Rload, and the LED lamp works in the low-power regime.

The temperature detection circuit can be placed inside the LED lamp, in order to, indirectly, derive information about the temperature/working status of the electronic transformer. The working environment temperature of LED lamp and that of the electronic transformer connected to it will generally be the same, especially at the moment when the power is turned on. As discussed above, their temperatures are positively correlated. Therefore, the temperature of the NTC resistor in the LED lamp is selected such that it has the same thermal increasing characteristic as that of the key/thermal increasing components in the electronic transformer.

After the electronic transformer and LED lamp start working, the temperature of the key components in the electronic transformer also increases over time and at a certain time they reach the temperature at which they are in stable-working status (note that this temperature may not be the final temperature of the electronic transformer for long term operation), and the temperature of the NTC resistors inside the LED lamp will also increase over time and reach the trigger point at the above certain time. Thus, before the electronic transformer and LED lamp reach a stable status, there will be positive correlation between (i) the temperature of the NTC resistor in the LED lamp, (ii) the temperature of the key components in the electronic transformer and (iii) the working time of the electronic transformer since it started up.

When the environment temperature is low and the power has just been turned on, the temperature of the NTC resistor is low, and the temperature of the key components in the electronic transformer is also low. When the environment temperature is high (such as room temperature of 25 degrees Celsius) and the power has just been turned on, the NTC resistor temperature is high, and the temperature of the key components in the electronic transformer is also high.

While the NTC resistor has not yet reached a stable temperature after powering on, the longer the working time, the higher the temperature of the NTC resistor, and the higher the temperature of the key components in the electronic transformer. Thus, the temperature of the NTC resistor in the LED lamp not only reflects the information of the environmental temperature, but also indirectly reflects the information of how long it has worked, hence it can be used to judge the working status of the electronic transformer, in particular it can be used as an indicator of whether the electronic transformer can start up and work normally with a light-weighted load, such as the LED arrangement alone.

For the above circuit example, specific design steps based on exemplary system requirements are shown below to explain how to design and choose the circuit parameters. The example uses just one possible set of parameters, simply to explain the design process.

There is first a requirement to start up at a low environment temperature. The specification of a LED lamp for example requires that the system input power of the combination of the electronic transformer and the LED lamp shall be within a range of 4.5 W +/−10% after the LED lamp reaches stable status at room temperature of 25 degrees Celsius. Considering the loss of the electronic transformer, the input power of LED lamp therefore, in this example, cannot exceed 3.8 W.

At a low ambient temperature, such as −10 degrees Celsius, when the electronic transformer is connected with the low-power LED lamp as the only load, the output voltage of the electronic transformer will be only about 1.5V, far less than the rated 12V output. It will cause the LED lamp to be very dark, low powered, and likely to flicker.

The heavier the load for the electronic transformer, the more likely the electronic transformer is to start up and work normally. Therefore, in such low environment temperature situations, the LED lamp should operate in the high-power regime to make the electronic transformer start up. For example, the input power of the LED lamp should increase from 3.8 W to 5.3 W, so that the electronic transformer will still be able to start up normally in such low environment temperatures, and output a voltage close to the input voltage needed by the LED lamp. This solves the problem of starting the electronic transformer and LED lamp at a low environment temperature.

There is then a requirement for the LED lamp to operate at a stable input power at room temperature. When the electronic transformer and the LED lamp work for a period of time (such as within 30 minutes) and may reach the normal temperature of 25 degrees Celsius, the electronic transformer almost reaches its stable status. Then, the LED lamp should work in the low-power regime, for example presenting the input power of 3.8 W. In this way, the input power of the combination of the electronic transformer and LED lamp can meet the specification requirements.

Some considerations of the parameter design and selection are now discussed.

For selecting the resistance of the secondary load Rload, it should be noted that the output voltage of the LED driver circuit should not trigger the over voltage protection, OVP, function when working in the high-power regime. An example of suitable value of Rload is 74Ω.

For an input current of around 130 mA, when the secondary load Rload is switched into the circuit, the output voltage of the LED driver circuit will be raised by about 9.6V (74×0.13), and the output power of the LED lamp will be increased by about 1.25 W.

Thus, for different applications, the secondary load for example has a resistance in the range 50Ω to 200Ω.

The input power of LED lamp is 5.3 W and output power is 4.45 W when it works in the high-power regime; the input power of LED lamp is 3.8 W and output power is 3.2 W when it works in the low-power regime. When shifting from the high-power regime to the low-power regime, about 1.25 W power consumption associated with the secondary load Rload is saved. A short period of 1.25 W non-light output power consumption before the electronic transformers enters stable state is a trade off with respect to stable lighting output of the LED lamp.

The temperature at which the NTC resistor temperature causes the circuit to switch from the high-power regime to the low-power regime is also designed. During a design phase, the LED lamp is operated in the high-power regime until it reaches a stable status at the normal temperature of 25 degrees Celsius. The temperature of NTC resistor is then tested, and may for example be about 95 degrees Celsius.

In order to ensure that the LED lamp can shift to the low-power regime at 25 degrees Celsius with some margin, the design may such that when the ambient temperature is about 10 degrees Celsius, the LED lamp can shift from the high-power regime to the low-power regime just when it reaches the steady state.

Testing at the ambient temperature of 10 degrees Celsius for example results in a temperature of the NTC resistor of about 80 degrees Celsius when the LED lamp is operating in the high-power regime for more than 1 hour, which means it has reached its stable state.

Thus, the critical temperature of the NTC resistor when the LED lamp shifts from the high-power regime to the low-power regime can be set to 80 degrees Celsius in this example. This 80 degree temperature then functions as a threshold which corresponds to a temperature of the external power supply (i.e. 10 degrees Celsius) below which the external power supply does not work normally for a load comprising the light emitting load alone. In other words, a stable temperature of 80 degrees corresponds to a power supply temperature of 10 degrees Celsius, and there is a risk of incorrect operation of the power supply at or below 10 degrees Celsius.

The NTC resistor for example has a resistance of 100 kΩ at room temperature of 25 degrees Celsius and 11.75 kΩ at 80 degrees Celsius. The resistor R1 may then be chosen to be 120 kΩ, so that when working at the ambient temperature of 10 degrees Celsius, the LED lamp can shift from the high-power regime to the low-power regime when it just reaches its stable status, which for example happens within 30 minute after power up.

An output capacitor is normally used within the circuit (not shown, but which may also be present in the circuit of the invention) at the end of the LED driver circuit with a large capacitance such as several hundreds of µF. If the transistor M2 is suddenly switched on, the switching will cause the capacitor to quickly discharge from the LED arrangement voltage plus the Rload voltage, to only the LED arrangement voltage.

This sudden voltage change will cause a high spike of the output current. Such a current spike will cause a spike in the output light of the LED lamp, and may damage the LED.

The resistor R2 and capacitor C1 are so chosen to form a RC filter circuit, which can make the turning-on of the transistor M2 slower, so that the discharge and voltage drop of the LED driver output capacitor is slowed, hence avoiding the spike current through the LED arrangement.

Example vales are 330 kΩ for the resistor R2 and 2.2 µF for the capacitor C1. This gives an RC time constant of 0.726 ms. The power regime shifting will take about 1 second, and no light spike will be visible.

The Zener diodes Z1 and Z2 are chosen to ensure the safe operation of the transistors M1 and M2. The output voltage of the LED driver circuit is for example no more than 40V, guaranteed by the over voltage protection function of the LED driver. The maximum gate-to-source voltage for transistors M1 and M2 is typically 20V, the Zener diodes Z1 and Z2 may be 20V Zener diodes.

The transistors M1 and M2 should have drain-to-source breakdown voltages higher than 40V.

The control circuit has a hysteresis function. When the NTC resistor temperature rises to 80 degrees Celsius after start up, the system shifts to the low-power regime, and the output voltage of LED driver circuit will be reduced by about 9.6V, which is the voltage on the secondary load Rload. The power shift will cause the divided voltage between Rntc and R1 to decrease, which causes a temperature hysteresis of about 41.5 degrees Celsius. As a result, the LED lamp will only shift back to the high-power regime if the NTC resistor temperature decreases to 80−41.5=38.5° C. Alternatively, once the lamp already enters the low power regime, meaning that the electronic transformer already warms up, the lamp would not enter high power regime any longer in this power on period. Once the lamp has been turned off and turned on again, the lamp does the measurement and controls the power again.

Thus, by using a regulated current driver, the delivered voltage will depend on the power regime (which depends on the load present). The change in driver output voltage which accompanies a change in load thus automatically introduces a hysteresis function to the operation of the circuit. The hysteresis function guarantees smooth shifting of the LED lamp from the high-power regime to the low-power regime, without oscillation back and forth between the high and low power regimes.

The tested temperature difference of the NTC resistor between when the LED lamp works in the high-power regime and when it works in the low-power regime is about 25.8 degrees. Since the temperature hysteresis explained above is much higher than the temperature difference, it will not switch back to the high-power regime after it has shifted to the low power regime. Thus, the high power regime is used only for initial start up of the circuit and does not contribute to long term additional power consumption once the circuit has switched to the low-power regime.

Based on the design of the circuit parameters as explained above, the operation of the circuit (in this particular example) is that when the ambient temperature is at or above 10 degrees Celsius (and below a maximum level for which the high-power regime is not needed at all), the system will work in the high-power regime when powered on. After a period of time (e.g. less than 30 minutes), when the NTC resistor temperature reaches 80 degrees Celsius, the circuit will switch to the low-power regime and keep working in the low-power regime.

If the ambient temperature is below 10 degrees Celsius, the system will work in the high-power regime when powered on and it may remain in that regime (because the 80 degrees Celsius threshold temperature is not reached even in the steady state).

The additional e.g. 1.25 W of power consumption is tolerated to ensure correct functioning of the lamp with the external power supply.

Figure 4:
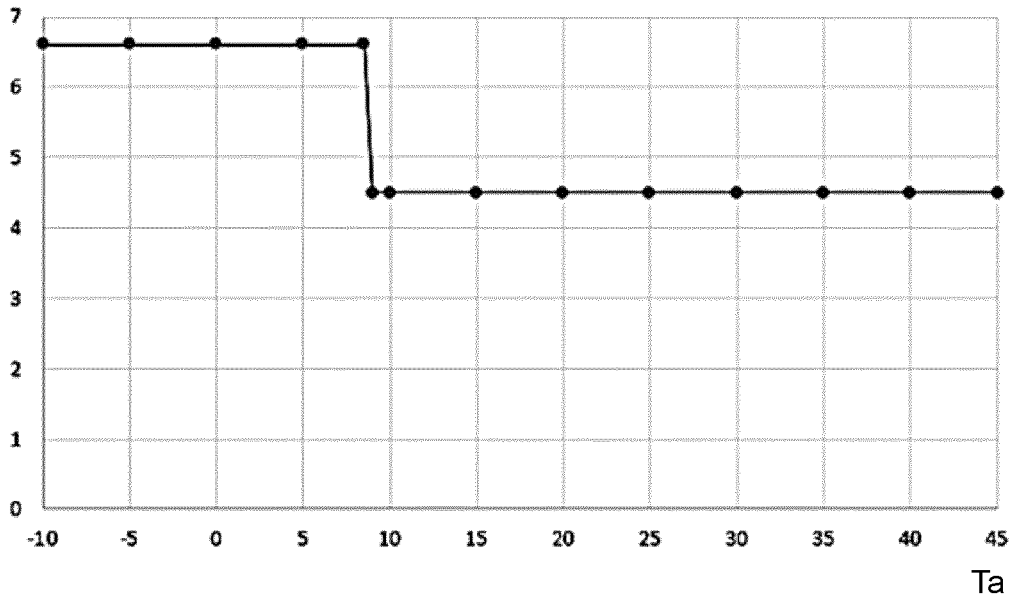
FIG. 4 shows test results, and shows the system input power at the steady state for different ambient temperatures.
Figure 5:
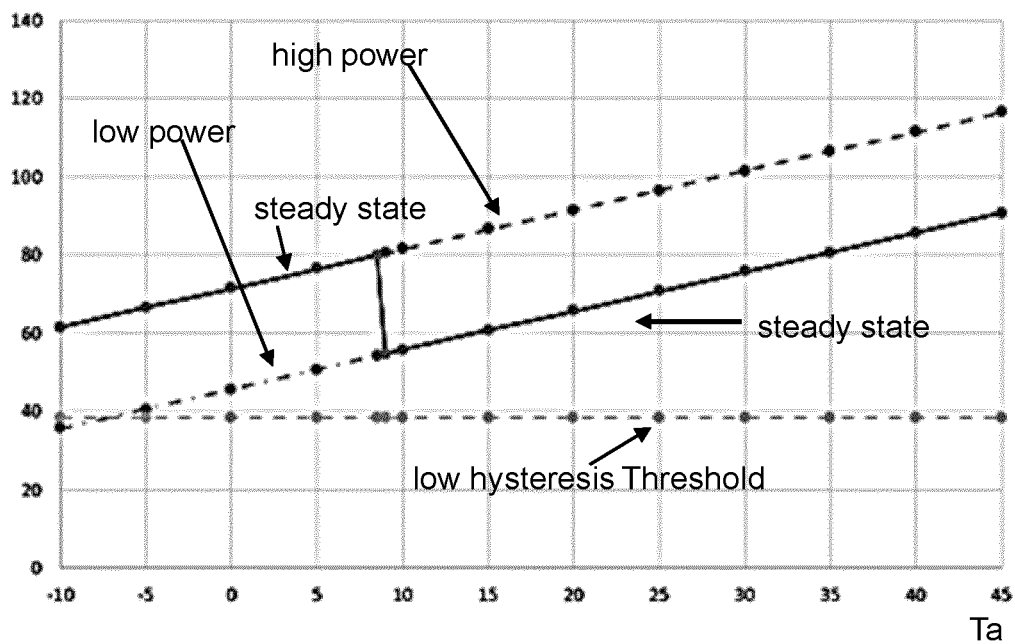
FIG. 5 shows further test results, and shows a plot of the sensed temperature versus the ambient temperature.

FIGS. 4 and 5 show the results of tests.

FIG. 4 shows the system input power (y-axis, W) at the steady state for different ambient temperatures (x-axis, degrees Celsius). The system input power is for the electronic transformer and the LED lamp system.

It can be seen that for temperatures of 10 degrees Celsius and above, the steady state uses the low-power regime. For temperatures below 10 degrees Celsius the steady state uses the high-power regime.

Measured at 25 degrees Celsius ambient temperature, after power on for 5 minutes and 30 seconds, the NTC resistor temperature reaches 78 degrees Celsius, the LED arrangement shifts to the low-power regime and works stably. The LED lamp input power keeps at 3.8 W and the input power to the electronic transformer stays at 4.45 w, which meets the requirements.

Measured at a low ambient temperature of −10 degrees Celsius, the LED lamp can work normally at power on, and keeps working in the high-power regime, in which the LED lamp input power is 5.3 W. After working stably for 1 hour, the NTC temperature reaches 61.5° C.

FIG. 5 shows a plot of the NTC temperature Tntc (y-axis, degrees Celsius) versus the ambient temperature Ta.

The low hysteresis threshold results from the level shift in the voltage divider, as explained above. The functions of NTC resistor temperature versus ambient temperate are shown for the low-power regime and for the high-power regime, and the steady state plot shows that the low-power regime is used in the steady state below 10 degrees Celsius, whereas the high-power regime is used in the steady state for 10 degrees Celsius and above.

This invention is applicable to all low-voltage LED lamps that work with electronic transformers, such as MR16, MR11, capsule G4, capsule G8, capsule G9, etc. The majority of these low voltage LED lamps are used in a warm indoor environment, but some of them are used in outdoor environment or cold indoor environment. Outdoor applications include, for example, the outdoor corridor of some hotels, in winter mornings or nights, or in cold areas.

The cold indoor applications include, for example, food outlets, aisles of stores and hotels, lift lobbies, or even living rooms, in winter mornings or nights, or in cold areas.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality.

The mere fact that certain measures are recited in mutually different dependent claims does not indicate that a combination of these measures cannot be used to advantage.

If the term "adapted to" is used in the claims or description, it is noted the term "adapted to" is intended to be equivalent to the term "configured to".

Any reference signs in the claims should not be construed as limiting the scope.

The invention claimed is:

1. A lighting device comprising:
   an input adapted to connect to an external power supply;
   a light emitting load to be powered by the external power supply;
   a secondary load to be powered by the external power supply; and
   a controller configured to:
      receive a temperature measurement, which temperature measurement is related to a temperature of the external power supply;
      activate the secondary load, and allow the secondary load to be powered by the external power supply, when the temperature measurement is below a threshold,
   wherein the lighting device is configured to:
      work in a high-power regime, by activating the secondary load, so as to provide a heavier load for the external power supply when the temperature measurement is below a threshold; and
      work in a low-power regime, by deactivating the secondary load, so as to provide a less heavy load for the external power supply when the temperature measurement is above the threshold.

2. The lighting device according to claim 1, wherein the threshold corresponds to a temperature of the external power supply below which the external power supply does not work normally for the lighting device with the secondary load deactivated, and
   the power of the light emitting load is the same in the high-power regime and in the low power regime.

3. The lighting device according to claim 2, wherein the input configured to connect to an electronic transformer as the external power supply.

4. The lighting device according to claim 1, wherein the controller is configured to deactivate the secondary load thereby disallowing the external power supply to power the secondary load when the temperature measurement is above the threshold, and the secondary load is non-light emitting.

5. The lighting device according to claim 4, wherein the secondary load is a load resistor.

6. The lighting device according to claim 1, wherein the secondary load is in series with the light emitting load.

7. The lighting device according to claim 1, comprising a temperature sensor for providing the temperature measurement to the controller, wherein the temperature sensor is placed in the lighting device and adapted to indirectly indicative of the temperature of the external power supply.

8. The lighting device according to claim 7, wherein the temperature sensor comprises a negative temperature coefficient resistor, and the controller is adapted to keep deactivating the secondary load after an initial deactivation, even if the temperature measurement provided by the temperature sensor drops again below the threshold.

9. The lighting device according to claim 1, wherein the controller comprises a bypass switch in parallel with the secondary load for bypassing the secondary load, in response to the temperature measurement.

10. The lighting device according to claim 9, wherein the controller comprises a further switch which is controlled based on the temperature measurement, wherein the switch state of the further switch determines the switch state of the bypass switch.

11. The lighting device according to claim 1, comprising an LED lamp, wherein the load comprises an LED arrangement, and the lighting device further comprises an LED driver circuit between the external power supply and the LED arrangement.

12. The lighting device according to claim 11, wherein the LED driver comprises a single stage power converter.

13. A lighting installation, comprising:
    a lighting device according to claim 3; and
    the electronic transformer as the external power supply adapted to power the lighting device.

14. A method of controlling a lighting device, comprising:
    obtaining a temperature measurement, wherein the temperature measurement is related to a temperature at an external power supply; and if the temperature measurement is below a threshold, activating a secondary load, to allow a lighting load and the secondary load to be powered by the external power supply and provide a heavier load for the external power supply; and if the temperature measurement is above the threshold, deactivating the secondary load to allow the lighting load and not the secondary load to be powered by the external power supply and provide a less heavy load for the external power supply.

15. The method according to claim 14, comprising using an electronic transformer, external to the lighting device, as the external power supply, and obtaining the temperature measurement internally of the lighting device which temperature measurement indirectly indicates the temperature of the electronic transformer, and the power of the light emitting load is the same for both the temperature measurement is below the threshold.

* * * * *